United States Patent
Oue et al.

(10) Patent No.: US 11,260,869 B2
(45) Date of Patent: Mar. 1, 2022

(54) CONTROL DEVICE FOR AUTOMATIC TRANSMISSION

(71) Applicant: JATCO Ltd, Fuji (JP)

(72) Inventors: Tomoko Oue, Fukuroi (JP); Masashi Yamaji, Fuji (JP); Hiroshi Tsuchiya, Shizuoka (JP); Shin Tsukamoto, Aichi (JP)

(73) Assignee: JATCO LTD, Fuji (JP)

( * ) Notice: Subject to any disclaimer, the term of this patent is extended or adjusted under 35 U.S.C. 154(b) by 0 days.

(21) Appl. No.: 17/251,384

(22) PCT Filed: May 29, 2019

(86) PCT No.: PCT/JP2019/021185
§ 371 (c)(1),
(2) Date: Dec. 11, 2020

(87) PCT Pub. No.: WO2019/239885
PCT Pub. Date: Dec. 19, 2019

(65) Prior Publication Data
US 2021/0237733 A1    Aug. 5, 2021

(30) Foreign Application Priority Data

Jun. 14, 2018  (JP) .............................. JP2018-113471

(51) Int. Cl.
*F16H 61/12*    (2010.01)
*B60W 30/188*    (2012.01)
(Continued)

(52) U.S. Cl.
CPC .......... *B60W 30/188* (2013.01); *B60W 10/06* (2013.01); *B60W 10/107* (2013.01);
(Continued)

(58) Field of Classification Search
CPC .. B60W 30/188; B60W 10/06; B60W 10/107; B60W 2510/107; B60W 2520/10;
(Continued)

(56) References Cited

U.S. PATENT DOCUMENTS

| | | | |
|---|---|---|---|
| 9,266,537 B1* | 2/2016 | Lee | F16H 61/12 |
| 2018/0003296 A1* | 1/2018 | Hoshino | F16H 61/12 |
| 2020/0284341 A1* | 9/2020 | Kim | F16H 61/0025 |

FOREIGN PATENT DOCUMENTS

| | | | | |
|---|---|---|---|---|
| JP | 2000-009224 A | 1/2000 | | |
| WO | WO-2020031678 A1 * | 2/2020 | ............. | F16H 61/68 |

* cited by examiner

*Primary Examiner* — Roger L Pang
(74) *Attorney, Agent, or Firm* — Foley & Lardner LLP (57) ABSTRACT

A control device for an automatic transmission includes: a failure diagnosis section for diagnosing whether or not a failure has occurred in a shift control system of the automatic transmission; a fail-safe control section for fixing the automatic transmission into a predetermined gear position in response to confirmation of the failure of the shift control system of the automatic transmission; and an oil temperature rise regulation torque reduction control section for outputting a torque reduction request to suppress torque of a vehicle driving source, based on temperature of transmission operating oil of the automatic transmission, and outputting the torque reduction request in response to satisfaction of an oil temperature condition that is set lower in oil temperature when the automatic transmission is fixed in a first gear position by the fail-safe control section than when the automatic transmission is not fixed in the first gear position.

18 Claims, 6 Drawing Sheets

(51) Int. Cl.
    *B60W 10/06*    (2006.01)
    *B60W 10/107*   (2012.01)
    *F16H 37/02*    (2006.01)
    *F16H 59/72*    (2006.01)
    *F16H 61/16*    (2006.01)
    *F16H 61/662*   (2006.01)
    *F16H 63/50*    (2006.01)

(52) U.S. Cl.
    CPC ........... *F16H 37/021* (2013.01); *F16H 59/72* (2013.01); *F16H 61/12* (2013.01); *F16H 61/16* (2013.01); *F16H 61/662* (2013.01); *F16H 63/50* (2013.01); *B60W 2510/107* (2013.01); *B60W 2520/10* (2013.01); *B60W 2710/0666* (2013.01); *B60W 2710/0672* (2013.01); *B60W 2710/1005* (2013.01); *B60W 2720/10* (2013.01); *F16H 2061/1232* (2013.01)

(58) Field of Classification Search
    CPC ... B60W 2710/0666; B60W 2710/271; B60W 2710/0672; B60W 2710/1005; B60W 2720/10; B60W 2061/1232; B60W 10/11; F16H 37/021; F16H 59/72; F16H 61/12; F16H 61/16; F16H 61/662; F16H 63/50; F16H 2061/1232; F16H 61/66
    USPC ..................................................... 701/62, 63
    See application file for complete search history.

| OIL TEMPERATURE | EXCEPT FOR THE RIGHT | HIGH OIL TEMPERATURE CONTROL | | | | | | | EXCEPT FOR THE LEFT | |
|---|---|---|---|---|---|---|---|---|---|---|
| | | UNDER ABNORMAL CONDITION (AUXILIARY TRANSMISSION FIXED IN FIRST GEAR WITH OFF COMMAND TO SOL) | | | | | | | | |
| | | Temp1 ≤ Temp | | | Temp2 ≤ Temp | | | | | |
| | Temp < Temp1 | | | | | | | | | |
| VEHICLE SPEED | --- | --- | VSP < VSP2 | VSP2 ≤ VSP | VSP < VSP1 | VSP1 ≤ VSP < VSP2 | VSP2 ≤ VSP | VSP < VSP1 | VSP1 ≤ VSP | |
| HIGH OIL TEMPERATURE CONTROL CONDITION TORQUE REDUCTION (FOR ABNORMAL CONDITION) | INACTIVE | INACTIVE | INACTIVE | ACTIVE | INACTIVE | INACTIVE | ACTIVE | INACTIVE | INACTIVE | |
| HIGH OIL TEMPERATURE CONTROL CONDITION TORQUE REDUCTION (PREVAILING) | INACTIVE | INACTIVE | INACTIVE | INACTIVE | INACTIVE | INACTIVE | ACTIVE | INACTIVE | ACTIVE | |
| LIMP-HOME CONDITION TORQUE REDUCTION | ACTIVE IN SOME SITUATION | ACTIVE | ACTIVE | ACTIVE | ACTIVE | ACTIVE | ACTIVE | ACTIVE IN SOME SITUATION | ACTIVE IN SOME SITUATION | |
| TORQUE REDUCTION IN ACCORDANCE WITH CLUTCH CAPACITY | ACTIVE IN SOME SITUATION | ACTIVE | ACTIVE | ACTIVE | ACTIVE | ACTIVE | ACTIVE | ACTIVE IN SOME SITUATION | ACTIVE IN SOME SITUATION | |
| FINALIZED TORQUE REDUCTION (MINIMUM SELECTION) | ARBITRARY TORQUE REDUCTION | LIMP-HOME CONDITION TORQUE REDUCTION | LIMP-HOME CONDITION TORQUE REDUCTION | HIGH OIL TEMPERATURE CONTROL TORQUE REDUCTION FOR ABNORMAL CONDITION | LIMP-HOME CONDITION TORQUE REDUCTION | LIMP-HOME CONDITION TORQUE REDUCTION | HIGH OIL TEMPERATURE CONTROL TORQUE REDUCTION | MINIMUM SELECTION | ARBITRARY TORQUE REDUCTION | HIGH OIL TEMPERATURE CONTROL TORQUE REDUCTION |

CONTROL DEVICE FOR AUTOMATIC TRANSMISSION

TECHNICAL FIELD

The present invention relates to a control device for an automatic transmission mounted on a vehicle.

BACKGROUND ART

Conventionally, each frictional engagement element of an automatic transmission is provided with a hydraulic switch for sensing a hydraulic pressure supplied to the frictional engagement element, and an abnormality in hydraulic pressure is detected by finding that a plurality of hydraulic switches that are not simultaneously turned on under normal condition are simultaneously turned on. A patent document 1 discloses a fail-safe device for a vehicular automatic transmission, wherein: when an abnormality in hydraulic pressure is detected (S1), a fail-safe determination duration is set to decrease as a load on the transmission at that time increases (S4, S5); when the condition of hydraulic pressure abnormality continues for the fail-safe determination duration or longer (S7), operation is shifted to a fail-safe control for fixing the gear position (S8).

The patent document 1 describes "when an abnormality occurs, operation is shifted to a fail-safe control such as a control to fix the transmission into a third gear position. On the other hand, in order to ensure a driving force required for traveling in a limp-home mode to travel toward a dealer or home while fixing the automatic transmission to a specific gear position under the fail-safe control, it is desirable that the specific gear position is a low speed gear position. However, if the automatic transmission is fixed into a low speed gear position, there may be a problem that a transmission input speed gets high and friction gets large so that the temperature of transmission operating oil tends to rise undesirably.

The present invention has been made in view of the foregoing problem, and it is an object of the present invention to suppress temperature of transmission operating oil from rising in limp-home mode while ensuring a required driving force.

PRIOR ART DOCUMENT(S)

Patent Document(s)

Patent Document 1: JP 2000-9224 A

SUMMARY OF INVENTION

In order to achieve the above object, according to the present invention, a control device for an automatic transmission, wherein the automatic transmission is mounted between a vehicle driving source and a driving wheel, and has a plurality of gear positions, the control device includes: a transmission controller structured to control shifting of the automatic transmission, wherein the transmission controller includes: a failure diagnosis section configured to diagnose whether or not a failure has occurred in a shift control system of the automatic transmission; a fail-safe control section configured to fix the automatic transmission into a predetermined one of the gear positions in response to confirmation of the failure of the shift control system of the automatic transmission; and an oil temperature rise regulation torque reduction control section configured to output a torque reduction request to suppress torque of the vehicle driving source, based on temperature of transmission operating oil of the automatic transmission; wherein the oil temperature rise regulation torque reduction control section is configured to output the torque reduction request in response to satisfaction of an oil temperature condition, wherein the oil temperature condition is set lower in oil temperature when the automatic transmission is fixed in a first gear position by the fail-safe control section than when the automatic transmission is not fixed in the first gear position.

This feature allows the fail-safe control for fixation into the first gear position. The oil temperature condition is set lower in oil temperature when the transmission is fixed in the first gear position so that torque reduction operation can is be more early started, than when the transmission is not fixed in the first gear position. This feature serves to suppress the temperature of the transmission operating oil from rising in limp-home mode while ensuring a required driving force.

MODE(S) FOR CARRYING OUT INVENTION

The following describes modes for carrying out a control device for an automatic transmission according to the present invention, with reference to a first embodiment shown in the drawings.

First Embodiment

The control device according to the first embodiment is applied to an engine vehicle provided with an auxiliary-transmission-equipped continuously variable transmission AT/CVT (as an example of automatic transmission), which has both a continuously variable transmission function and a stepwise variable transmission function. The following describes configuration of the first embodiment in sections "Overall System Configuration", "Shift Control Configuration by Transmission Unit", "Cooperative Control System Configuration of Transmission Unit and Engine", and "Oil Temperature Rise Regulation Fail-Safe Control Processing Configuration".

Figure 1:
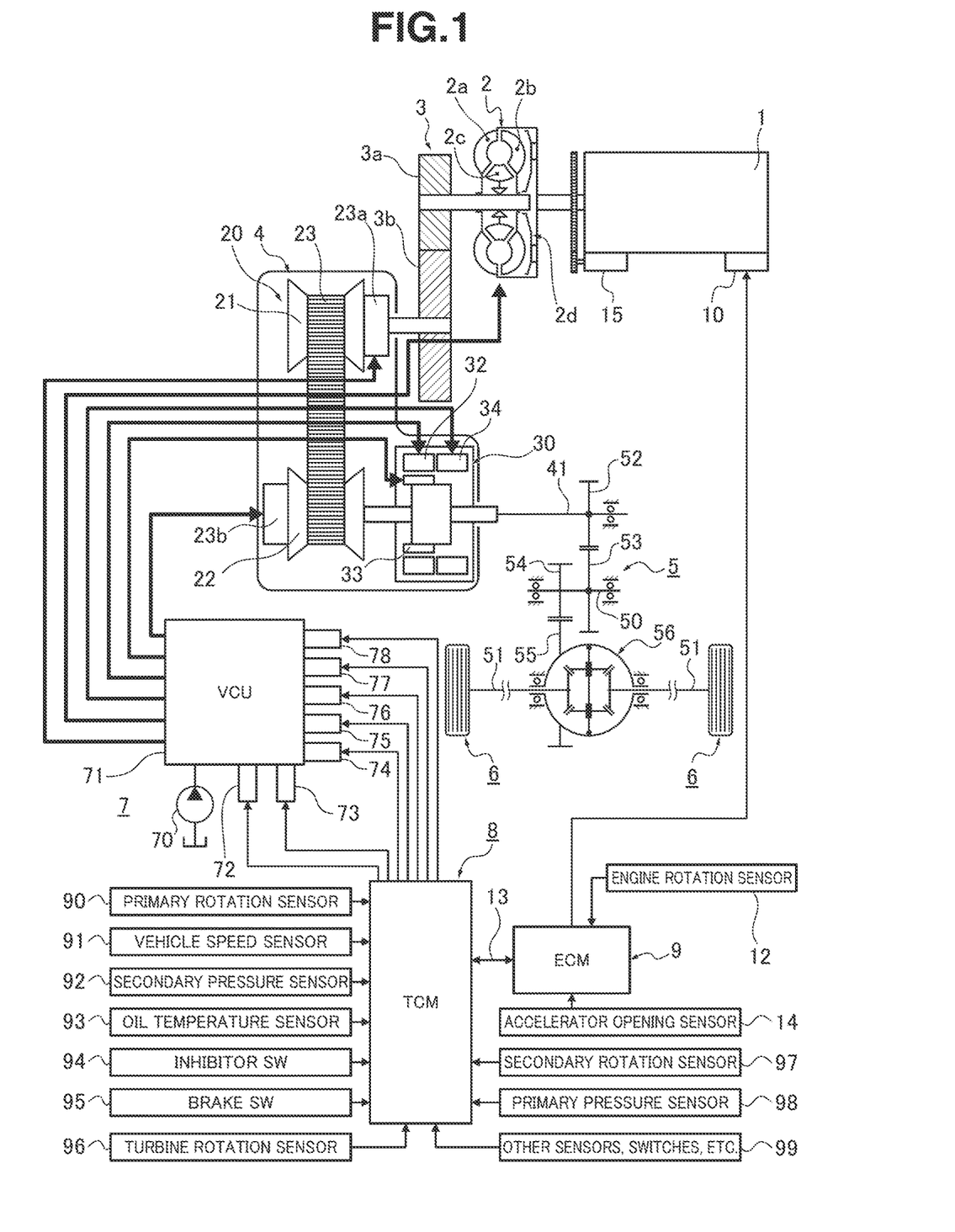
FIG. 1 is an overall system diagram showing a drive system and a control system of an engine vehicle on which an auxiliary-transmission-equipped continuously variable transmission is mounted as an example of automatic transmission, to which a control device according to a first embodiment is applied.

[Overall System Configuration] FIG. 1 shows a drive system and a control system of the engine vehicle provided with the auxiliary-transmission-equipped continuously variable transmission AT/CVT to which the control device according to the first embodiment is applied. The following describes an overall system configuration with is reference to FIG. 1.

As shown in FIG. 1, the drive system of the engine vehicle includes an engine 1, a torque converter 2, a reduction gear pair 3, a transmission unit 4, a final reduction gear mechanism 5, and driving wheels 6. The auxiliary-transmission-equipped continuously variable transmission AT/CVT is configured by mounting the torque converter 2, reduction gear pair 3, transmission unit 4, and final reduction mechanism 5 in a transmission case not shown.

The engine 1 is configured to perform an engine torque control in accordance with driver's accelerator operation, and also perform a torque reduction control that defines an upper limit of engine torque in response to a torque reduction request from the outside. The engine 1 includes: a torque control actuator 10 that performs a torque reduction control by throttle valve opening/closing control, ignition timing retard control, etc.; and a starter motor 15 for engine starting.

The torque converter 2 is a three-element one-stage two-phase fluid transmission device arranged between the engine 1 and the reduction gear pair 3, and structured to perform a power transmission function, a torque fluctuation damping function, and a torque amplification function. The torque converter 2 includes a turbine runner 2a, a pump impeller 2b, a stator 2c, and a lockup clutch 2d.

The turbine runner 2a is an input element to which power is inputted from the engine 1. The pump impeller 2b is an output element that transmits power to an output side where the transmission unit 4 including frictional engagement elements is arranged. The stator 2c is a torque amplification element that is interposed between the turbine runner 2a and the pump impeller 2b, which are arranged opposite to each other, and is connected via a one-way clutch to a stationary member such as a case. The lockup clutch 2d is arranged inside a converter cover of the torque converter 2, and directly connects the turbine runner 2a and the pump impeller 2b of the torque converter 2 by clutch engagement.

The reduction gear pair 3 is composed of a smaller-diameter gear 3a that is rotationally driven by an output of the torque converter 2, and a larger-diameter gear 3b that meshes with the smaller-diameter gear 3a and has an output to the transmission unit 4.

The transmission unit 4 includes a variator 20 that is a belt-type continuously variable transmission mechanism, and an auxiliary transmission mechanism 30 that is arranged in series with the variator 20. The phrase "arranged in series" means that the variator 20 and the auxiliary transmission mechanism 30 are arranged in series with each other in a power transmission path. The auxiliary transmission mechanism 30 may be directly connected to an output shaft of the variator 20 as in this example, or may be connected via another speed change mechanism or power transmission mechanism (for example, a gear train).

The variator 20 is a belt-type continuously variable transmission mechanism that includes a primary pulley 21, a secondary pulley 22, and a pulley belt 23 that is wound over the two pulleys 21 and 22. The two pulleys 21 and 22 each include: a fixed conical plate; a movable conical plate that is disposed with its sheave face facing the fixed conical plate, and forms a V-shaped groove between the fixed conical plate and the movable conical plate; and a primary pressure cylinder 23a or secondary pressure cylinder 23b provided on a backside of the movable conical plate to displace the movable conical plate in its axial direction. Adjustment of hydraulic pressures supplied to the primary pressure cylinder 23a and the secondary pressure cylinder 23b causes changes in width of the V-shaped grooves, and in contact radius between each of the two pulleys 21 and 22 and the pulley belt 23, thereby changing the transmission ratio of the variator 20 continuously.

The auxiliary transmission mechanism 30 is a stepwise variable transmission mechanism having two forward gear positions and one reverse gear position. The auxiliary transmission mechanism 30 includes a Ravigneaux type planetary gear mechanism in which carriers of two planetary gearsets are connected to each other, and frictional engagement elements (a low brake 32, a high clutch 33, a reverse brake 34) are provided. The frictional engagement elements, i.e. the low brake 32, high clutch 33, and reverse brake 34, are connected to rotating elements that form the Ravigneaux type planetary gear mechanism, and their connection state is varied.

The gear position of the auxiliary transmission mechanism 30 is changed by adjusting hydraulic pressures supplied to the frictional engagement elements 32 to 34 and switching the frictional engagement elements 32 to 34 between engaged state and disengaged state. For example, when the low brake 32 is engaged and the high clutch 33 and the reverse brake 34 are disengaged, the auxiliary transmission mechanism 30 is set into the first forward gear position (low gear position). When the high clutch 33 is engaged and the low brake 32 and the reverse brake 34 are disengaged, the auxiliary transmission mechanism 30 is set into the second forward gear position having a smaller transmission ratio (transmission ratio=1) than the first gear position. When the reverse brake 34 is engaged and the low brake 32 and the high clutch 33 are disengaged, the auxiliary transmission mechanism 30 is set into the reverse gear position. When all of the low brake 32, the high clutch 33, and the reverse brake 34 of the auxiliary transmission mechanism 30 are disengaged, the drive force transmission path is disconnected from the driving wheels 6.

The final reduction mechanism 5 is a mechanism that performs speed reduction from output rotation of the transmission unit 4 and performs a differential function to the left and right driving wheels 6 and 6. The final reduction gear mechanism 5 is a reduction gear mechanism including: an output gear 52 arranged on the variator output shaft 41; an idler gear 53 and a reduction gear 54 arranged on an idler shaft 50; and a final gear 55 arranged on an outer periphery of a differential case. The final reduction mechanism 5 includes a differential gear 56 as a differential gear mechanism interposed between left and right drive shafts 51, 51.

As shown in FIG. 1, the control system of the engine vehicle includes a hydraulic pressure control unit 7, a transmission control module 8 ("TCM" for short), and an engine control module 9 ("ECM" for short). The transmission control module 8 and the engine control module 9, which are electronic control systems, are connected to each other by a CAN communication line 13 that is configured to exchange information therebetween.

The hydraulic pressure control unit 7 includes: an oil pump 70 that is rotationally driven by the engine 1 that is a vehicle driving source; and a valve control unit 71 ("VCU" for short) that regulates various control pressures based on a discharge pressure from the oil pump 70. The hydraulic pressure control unit 7 regulates a line pressure PL, a primary pressure Ppri to the primary pressure cylinder 23a, and a secondary pressure Psec to the secondary pressure cylinder 23b. In addition, the hydraulic pressure control unit 7 regulates a low brake pressure P(L/B) to the low brake 32, a high clutch pressure P(H/C) to the high clutch 33, and a reverse brake pressure P(R/B) to the reverse brake 34. The hydraulic pressure control unit 7 further regulates a lockup differential pressure P(L/U) to the lockup clutch 2d.

The valve control unit 71 includes a line pressure solenoid valve 72, a primary pressure solenoid valve 73, and a secondary pressure solenoid valve 74. The valve control unit 71 further includes a low brake pressure solenoid valve 75, a high clutch pressure solenoid valve 76, a reverse brake pressure solenoid valve 77, and a lockup solenoid valve 78. Each solenoid valve 72, 73, 74, 75, 76, 77, 78 performs pressure regulation operation in accordance with a control command value (command current) outputted from the transmission control module 8.

The line pressure solenoid valve 72 produces the line pressure PL as commanded by regulating the discharge pressure from the oil pump 70 in accordance with a line pressure command value outputted from the transmission control module 8. The line pressure PL is a source hydraulic pressure from which various control pressures are produced, and is set so as to suppress belt slip and clutch slip with respect to torque transmitted through the drive system.

The primary pressure solenoid valve 73 produces the primary pressure Ppri as commanded by reduction from the line pressure PL in accordance with a primary pressure command value outputted from the transmission control module 8. The secondary pressure solenoid valve 74 produces the secondary pressure Psec as commanded by reduction from the line pressure PL in accordance with a secondary pressure command value outputted from the transmission control module 8.

The low brake pressure solenoid valve 75 produces the low brake pressure P(L/B) as commanded by reduction from the line pressure PL in accordance with a low brake pressure command value outputted from the transmission control module 8. The high clutch pressure solenoid valve 76 produces the high clutch pressure P(H/C) as commanded by reduction from the line pressure PL in accordance with a high clutch pressure command value outputted from the transmission control module 8. The reverse brake pressure solenoid valve 77 produces the reverse brake pressure P(R/B) as commanded by reduction from the line pressure PL in accordance with a reverse brake pressure command value outputted from the transmission control module 8.

The lockup solenoid valve 78 produces the lockup differential pressure P(L/U) for engagement/slip-engagement/disengagement of the lockup clutch 2d as commanded by pressure regulation in accordance with a command current outputted from the transmission control module 8.

The transmission control module 8 performs line pressure control, variator control, auxiliary transmission control, lockup control, etc. In the line pressure control, a command value is outputted to the line pressure solenoid valve 72 so as to achieve a target line pressure according to the accelerator opening APO and others. In the variator control, a target transmission ratio (target primary rotation speed Npri*) is determined, and command values are outputted to the primary pressure solenoid valve 73 and the secondary pressure solenoid valve 74 so as to achieve the determined target transmission ratio (target primary rotation speed Npri*).

In the auxiliary transmission control, command values are outputted to the solenoid valves 75, 76, 77 so as to control engagement/disengagement of the low brake 32, the high clutch 33, and the reverse brake 34 in accordance with a selected range position and an operating point (VSP, APO) on a shift schedule. In the lockup control, a command current is outputted to the lockup solenoid valve 78 so as to control the lockup differential pressure P(L/U) for engagement/slip-engagement/disengagement of the lockup clutch 2d.

The transmission control module 8 receives input of information from a primary rotation sensor 90, a vehicle speed sensor 91, a secondary pressure sensor 92, an oil temperature sensor 93, an inhibitor switch 94, a brake switch 95, and a turbine rotation sensor 96. The transmission control module 8 further receives input of information from a secondary rotation sensor 97, a primary pressure sensor 98, and sensors, switches, etc. 99.

The engine control module 9 receives input of sensor information from an engine rotation sensor 12, an accelerator opening sensor 14, etc. The transmission control module 8 outputs a request for information about engine speed, accelerator opening, and engine torque to the engine control module 9, and then receives, via the CAN communication line 13, engine speed Ne, accelerator opening APO, and estimated engine torque Te. When the transmission control module 8 further outputs a torque reduction request, the engine control module 9 receives the torque reduction request via the CAN communication line 13 and executes torque reduction control of the engine 1 in accordance with the requested torque.

[Shift Control Configuration by Transmission Unit]

Figure 2:
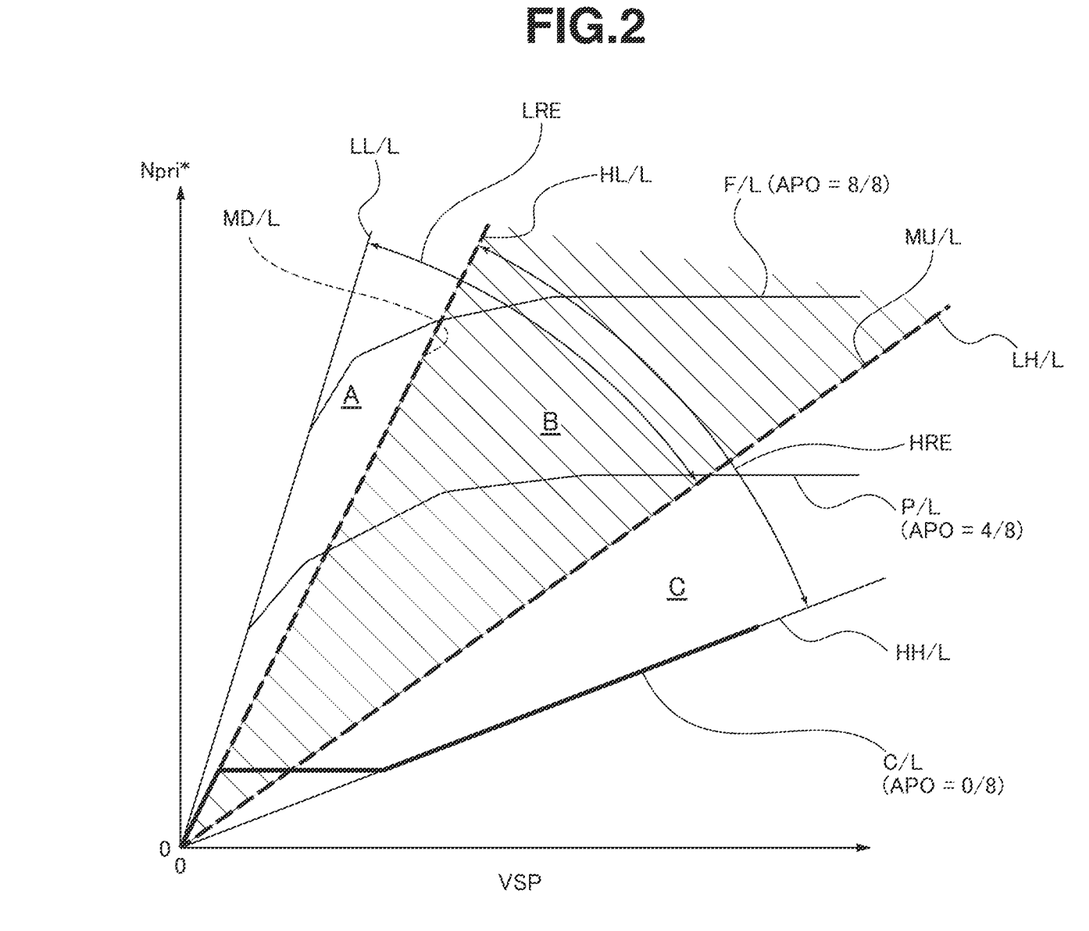
FIG. 2 is a shift schedule diagram showing an example of D-range shift schedule that is used for carrying out a shift control in a D-range shift mode by a variator and an auxiliary transmission mechanism.

FIG. 2 shows an example of D-range shift schedule used for executing the shift control in the D-range shift mode by the variator 20 and the auxiliary transmission mechanism 30. The following descries shift control configuration of the transmission unit with reference to FIG. 2.

The term "D-range shift schedule" contains: an A-region "LRE" according to a first gear position continuously variable shift schedule employed when the auxiliary transmission mechanism 30 is in the first gear position; and a C-region "HRE" according to a second gear position continuously variable shift schedule employed when the auxiliary transmission mechanism 30 is in the second gear position. In FIG. 2, a B-region is defined as a hatched region where the A-region LRE and the C-region HRE overlap each other.

The A-region LRE is a continuously variable transmission ratio region between a first gear lowest speed position transmission ratio line LL/L and a first gear highest speed position transmission ratio line LH/L, wherein at the first gear lowest speed position transmission ratio line LL/L, the variator 20 is set to the lowest speed transmission ratio with the auxiliary transmission mechanism 30 in the first gear position, and wherein at the first gear highest speed position transmission ratio line LH/L, the variator 20 is set to the highest speed transmission ratio with the auxiliary transmission mechanism 30 in the first gear position.

The C-region HRE is a second gear lowest speed position transmission ratio line HL/L and a second gear highest speed position transmission ratio line HH/L, wherein at the second gear lowest speed position transmission ratio line HL/L, the variator 20 is set to the lowest speed transmission ratio with the auxiliary transmission mechanism 30 in the second gear position, and wherein at the second gear highest speed position transmission ratio line HH/L, the variator 20 is set to the highest speed transmission ratio with the auxiliary transmission mechanism 30 in the second gear position. The B-region is an overlapped continuously variable transmission ratio region between the second gear lowest speed position transmission ratio line HL/L and the first gear highest speed position transmission ratio line LH/L.

In the D-range shift schedule, an upshift line MU/L for performing a 1-to-2 upshift of the auxiliary transmission mechanism 30 is set to substantially overlap with the first gear highest speed position transmission ratio line LH/L. Furthermore, a downshift line MD/L for performing a 2-to-1 downshift of the auxiliary transmission mechanism 30 is set to substantially overlap with the second gear lowest speed position transmission ratio line HL/L.

In each of the A-region LRE and the C-region HRE, a shift line is set for each accelerator opening APO. The shift control is performed based on the current vehicle speed VSP and the shift line selected according to the accelerator opening APO. For simplicity, FIG. 2 shows a full load line F/L (a shift line for accelerator opening APO=8/8) a partial line P/L (a shift line for accelerator opening APO=4/8), and a coast line C/L (a shift line for accelerator opening APO=0).

The term "D-range shift mode" is an automatic shift mode in which the transmission ratio of the variator 20 and the gear position of the auxiliary transmission mechanism 30 are automatically changed in accordance with the operating point (VSP, APO). During the transmission ratio control of the variator 20, the target primary speed Npri* is determined in accordance with the operating point (VSP,APO) on the D-range shift schedule of FIG. 2 specified by the vehicle speed VSP and the accelerator opening APO. Then, the pulley pressures are feedback-controlled to conform an actual primary rotation speed Npri from the primary rotation sensor 90 to the target primary rotation speed Npri*. The transmission ratio control of the variator 20 is executed when the auxiliary transmission mechanism 30 is held in the first gear position and when the auxiliary transmission mechanism 30 is held in the second gear position.

When the auxiliary transmission mechanism 30 is in the first gear position and the operating point (VSP, APO) on the D-range shift schedule in FIG. 2 crosses the upshift line MU/L, the shift control system of the auxiliary transmission mechanism 30 causes an upshift to the second gear position. On the other hand, when the auxiliary transmission mechanism 30 is in the second gear position and the operating point (VSP, APO) on the D-range shift schedule in FIG. 2 crosses the downshift line MD/L, the shift control system causes a downshift to the first gear position.

When an upshift or downshift of the auxiliary transmission mechanism 30 is executed, the variator 20 and the auxiliary transmission mechanism 30 are controlled in a manner to suppress a through transmission ratio of the transmission unit 4 (an overall transmission ratio obtained by multiplying the transmission ratio of the variator 20 by the transmission ratio of the auxiliary transmission mechanism 30) from rapidly changing. Specifically, during a transient phase of upshifting of the auxiliary transmission mechanism 30, and during a transient phase of downshifting of the auxiliary transmission mechanism 30, a target through transmission ratio is set appropriately so as to produce an appropriate gear shift transient response. When the control system of the variator 20 is normal, a cooperative control is performed to control the transmission ratio of the variator 20 in accordance with transient characteristics of the transmission ratio of the auxiliary transmission mechanism 30 so as to conform the actual through transmission ratio of the transmission unit 4 to the target through transmission ratio.

[Cooperative Control System Configuration of Transmission Unit and Engine]

Figure 3:
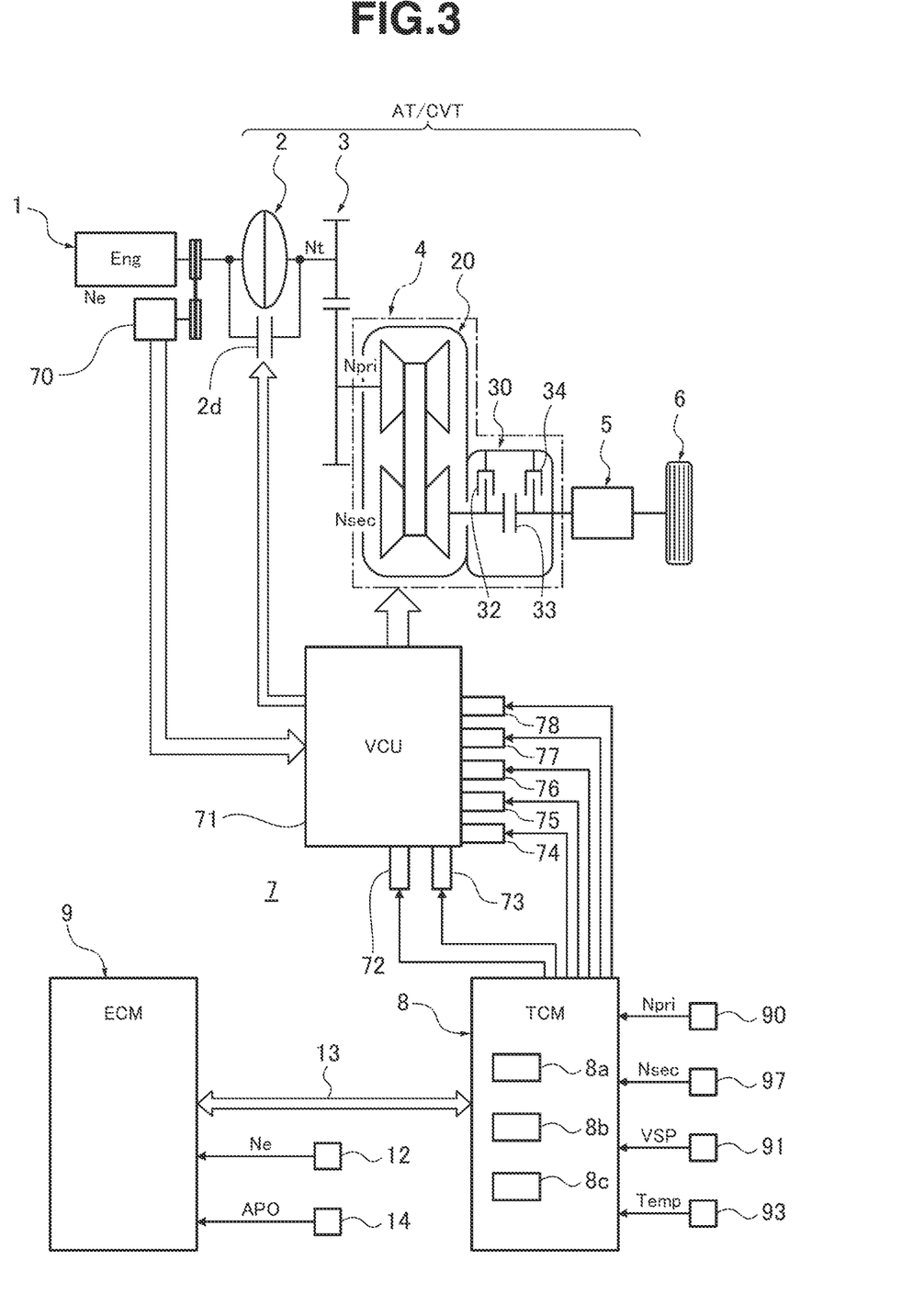
FIG. 3 is a schematic configuration diagram showing a cooperative control system of a transmission unit and an engine, which is the control device according to the first embodiment.
Figure 4:
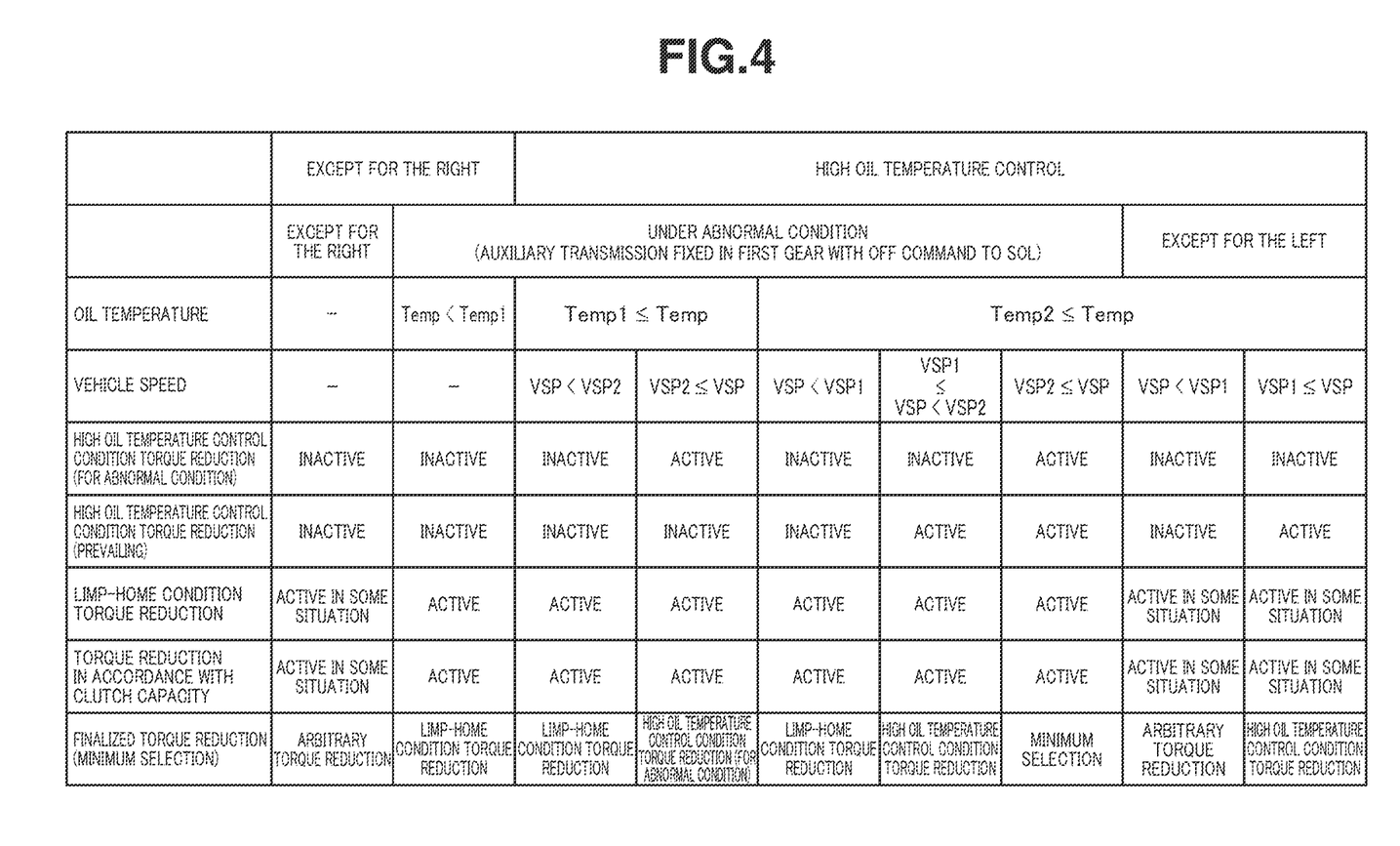
FIG. 4 is a diagram showing an oil temperature rise regulation torque reduction operation table based on an oil temperature condition and a vehicle speed condition in the auxiliary-transmission-equipped continuously variable transmission according to the first embodiment.

FIG. 3 shows a cooperative control system of the transmission unit 4 and the engine 1 as the control device according to the first embodiment. FIG. 4 shows an oil temperature rise regulation torque reduction operation table based on an oil temperature condition and a vehicle speed condition in the auxiliary-transmission-equipped continuously variable transmission AT/CVT according to the first embodiment. The following describes configuration of the cooperative control system of the transmission unit 4 and the engine 1 with reference to FIGS. 3 and 4.

As shown in FIG. 3, the drive system to be cooperatively controlled includes the engine 1 (vehicle driving source), torque converter 2, reduction gear pair 3, transmission unit 4, final reduction mechanism 5, and driving wheels 6.

The engine 1 drives the oil pump 70. The torque converter 2 includes the lockup clutch 2d. The transmission unit 4 includes the variator 20 and auxiliary transmission mechanism 30. The auxiliary transmission mechanism 30 includes the low brake 32, high clutch 33, and reverse brake 34.

As shown in FIG. 3, the cooperative control system of the transmission unit 4 and the engine 1 includes the hydraulic pressure control unit 7, transmission control module 8, and engine control module 9.

The valve control unit 71 of the hydraulic pressure control unit 7 includes the line pressure solenoid valve 72, primary pressure solenoid valve 73, and secondary pressure solenoid valve 74. The valve control unit 71 further includes the low brake pressure solenoid valve 75, high clutch pressure solenoid valve 76, reverse brake pressure solenoid valve 77, and lockup solenoid valve 78.

The transmission control module 8 receives input of the primary rotation speed Npri from the primary rotation sensor 90, the secondary rotation speed Nsec from the secondary rotation sensor 97, the vehicle speed VSP from the vehicle speed sensor 91, oil temperature Temp from the oil temperature sensor 93, and others.

The engine control module 9 receives input of the engine speed Ne from the engine speed sensor 12 and the accelerator opening APO from the accelerator opening sensor 14. The transmission control module 8 and the engine control module 9 are connected to each other via the CAN communication line 13 so as to allow information exchange therebetween.

The transmission control module 8 includes a failure diagnosis section 8a, a fail-safe control section 8b, and an oil temperature rise regulation torque reduction control section 8c.

The failure diagnosis section 8a diagnoses whether or not a failure has occurred in the shift control system of the variator 20 in the shift control system of the transmission unit 4.

The oil temperature rise regulation fail-safe control is performed in response to the following failures of the shift control system of the variator 20:

(a) disconnection of the primary rotation sensor 90,
(b) disconnection of the secondary rotation sensor 97,
(c) disconnection of the vehicle speed sensor 91, (d) disconnection, short-to-battery, short-to-ground, and functional abnormality of the line pressure solenoid valve 72, and (e) disconnection, short-to-battery, short-to-ground, and functional abnormality of the primary pressure solenoid valve 73.

When the failure of the shift control system of the variator 20 is confirmed when a state in which a failure determination threshold value is exceeded has continued for a predetermined duration. For example, when a state in which an actual variator ratio deviates from a target variator ratio by more than the failure determination threshold value has continued for the predetermined duration, the shift control system of the variator 20 is diagnosed as failed due to one of the foregoing items (a) to (e).

When the failure of the shift control system of the variator 20 in the shift control system of the transmission unit 4 is confirmed, the fail-safe control section 8b fixes the auxiliary transmission mechanism 30 in a predetermined gear position, and restricts the variator 20 from shifting to the low speed side.

Specifically, when the failure of the shift control system of the variator 20 is confirmed while the vehicle is traveling in the first gear position, the auxiliary transmission mechanism 30 is fixed in the first gear position. When the failure of the shift control system of the variator 20 is confirmed while the vehicle is traveling in the second gear position, the auxiliary transmission mechanism 30 is held in the second gear position, and when the vehicle speed VSP gets lower than or equal to a predetermined vehicle speed, the auxiliary transmission mechanism 30 is fixed into the first gear position. In this way, a first gear position fixation fail-safe control is performed to fix the auxiliary transmission mechanism 30 into the first gear position.

On the other hand, a fail-safe control for fixing the auxiliary transmission to the second gear position is implemented by: when the failure of the shift control system of the variator is confirmed during the first gear position driving, the auxiliary transmission is held in the first gear position, and after the vehicle is stopped, the auxiliary transmission is fixed into the second gear position. When the failure of the shift control system of the variator is confirmed during the second gear position driving, the auxiliary transmission is fixed in the second gear position. It may be configured to allow selection of one of the first gear position fixation fail-safe control and the fail-safe control with fixation of the auxiliary transmission into the second gear position.

The oil temperature rise regulation torque reduction control section 8c outputs a torque reduction request for suppressing the torque of the engine 1 based on the temperature of transmission operating oil of the transmission unit 4. The torque reduction request is outputted in response to satisfaction of an oil temperature condition, wherein the oil temperature condition is set to a first threshold value Temp1 when the auxiliary transmission mechanism 30 is fixed in the first gear position by the fail-safe control section 8b, wherein the oil temperature condition is set to a second threshold value Temp2 when the auxiliary transmission mechanism 30 is not fixed in the first gear position, and wherein the first threshold value Temp1 is lower than the second threshold value Temp2. The condition for outputting the torque reduction request to the engine control module 9 further contains a vehicle speed condition that the vehicle speed VSP is higher than or equal to a second threshold value VSP2, so that even when the oil temperature condition is satisfied, no torque reduction request is outputted while the vehicle speed VSP is less than the second threshold value VSP2. Situations where the auxiliary transmission mechanism 30 is not fixed in the first gear position include not only a situation where the auxiliary transmission mechanism 30 is fixed in the second gear position by the fail-safe control, but also includes a situation where no fail-safe control is executed and the auxiliary transmission mechanism 30 is set in a selected one of the first and second gear positions.

When a torque reduction request is outputted from the oil temperature rise regulation torque reduction control unit 8c, an upper limit of the torque of the engine 1 is regulated to a torque that allows traveling at a predetermined vehicle speed during limp-home operation. Furthermore, the oil temperature rise regulation torque reduction control section 8c is configured to set the torque of the engine 1 to have a characteristic of change such that the torque of the engine 1 changes along a ramp at a control entry to reduce the engine torque to the upper limit, and along a ramp at a control exit to return the engine torque from the upper limit to a default torque, where the engine torque is not changed in a stepwise manner.

The following describes actions of the oil temperature rise regulation torque reduction based on the oil temperature condition and the vehicle speed condition in the auxiliary-transmission-equipped continuously variable transmission AT/CVT with reference to FIG. 4. The term "abnormal condition" means a condition that the variator shift control system is diagnosed as failed during torque reduction for high oil temperature control condition. The term "prevailing" means torque reduction for high oil temperature control before addition of "high oil temperature control condition torque reduction (for abnormal condition)". In this example, as the high oil temperature control condition torque reduction is implemented by both of the prevailing torque reduction and the torque reduction for abnormal condition.

As shown in FIG. 4, there are types of torque reduction control, i.e. "high oil temperature control condition torque reduction (for abnormal condition)", "high oil temperature control condition torque reduction (prevailing)", "limp-home condition torque reduction", "torque reduction in accordance with clutch capacity".

The "limp-home condition torque reduction" and the "torque reduction in accordance with clutch capacity" are activated under abnormal condition (the auxiliary transmission fixed in the first gear position and SOL commanded to OFF), regardless of the oil temperature condition and vehicle speed condition. The torque reduction operation is activated in some situation except for the abnormal condition.

The "high oil temperature control condition torque reduction (prevailing)" is activated under abnormal condition in response to a condition that the oil condition that the second threshold value Temp2≤oil temperature Temp is satisfied, and the vehicle speed condition that the first threshold value VSP1≤vehicle speed VSP is satisfied. This torque reduction operation is activated also under normal condition when the oil temperature condition that the second threshold value Temp2≤oil temperature Temp is satisfied, and the vehicle speed condition that the first threshold value VSP1≤vehicle speed VSP is satisfied. Otherwise, this torque reduction is inactive. Namely, the "high oil temperature control condition torque reduction (prevailing)" is given the same oil temperature condition and vehicle speed condition regardless of whether it is abnormal or normal.

The "second threshold value Temp2" is set to a threshold value for suppressing the temperature of the transmission operating oil from rising when the auxiliary transmission is fixed in the second gear position for fail-safe control. The "first threshold value VSP1" is set to a vehicle speed threshold value for determining that the vehicle is running.

The "high oil temperature control condition torque reduction (for abnormal condition)" is activated in response to a condition that the oil temperature condition that the first threshold Temp1≤the oil temperature Temp is satisfied and the vehicle speed condition that the second threshold VSP2≤the vehicle speed VSP is satisfied. Furthermore, under abnormal condition, this torque reduction is activated when the oil temperature condition that the second threshold value Temp2≤the oil temperature Temp is satisfied and the vehicle speed condition that the second threshold value VSP2≤the vehicle speed VSP is satisfied. Otherwise, the torque reduction is inactive. In this way, with respect to the "high oil temperature control condition torque reduction (prevailing)", the "high oil temperature control condition torque reduction (for abnormal condition)" is set lower in oil temperature condition and higher in vehicle speed condition under abnormal condition.

The "first threshold value Temp1 (<second threshold value Temp2)" is set to a threshold value for suppressing the temperature of the transmission operating oil from rising when the auxiliary transmission is fixed in the first gear position for fail-safe control. The "second threshold value VSP2 (>first threshold value VSP1)" is set to a vehicle speed threshold value for determining that the vehicle speed VSP has increased due to restarting after fixation into the first gear position by the fail-safe control.

As shown in FIG. 4, when a plurality of types of torque reduction are activated, the minimum one is selected as a finalized quantity of torque reduction among the plurality of quantities of torque reduction (minimum selection). For example, under abnormal condition, while the oil temperature condition that the first threshold value Temp1≤the oil temperature Temp is satisfied, but the vehicle speed condition that the vehicle speed VSP<second threshold value VSP2 is satisfied, the limp-home condition torque reduction is activated. Then, when the vehicle speed VSP increases and the vehicle speed condition that the second threshold value VSP2≤vehicle speed VSP is satisfied, the high oil temperature control torque reduction (for abnormal condition) (<limp-home condition torque reduction) is activated.

[Oil Temperature Rise Regulation Fail-Safe Control Processing Configuration]

Figure 5:
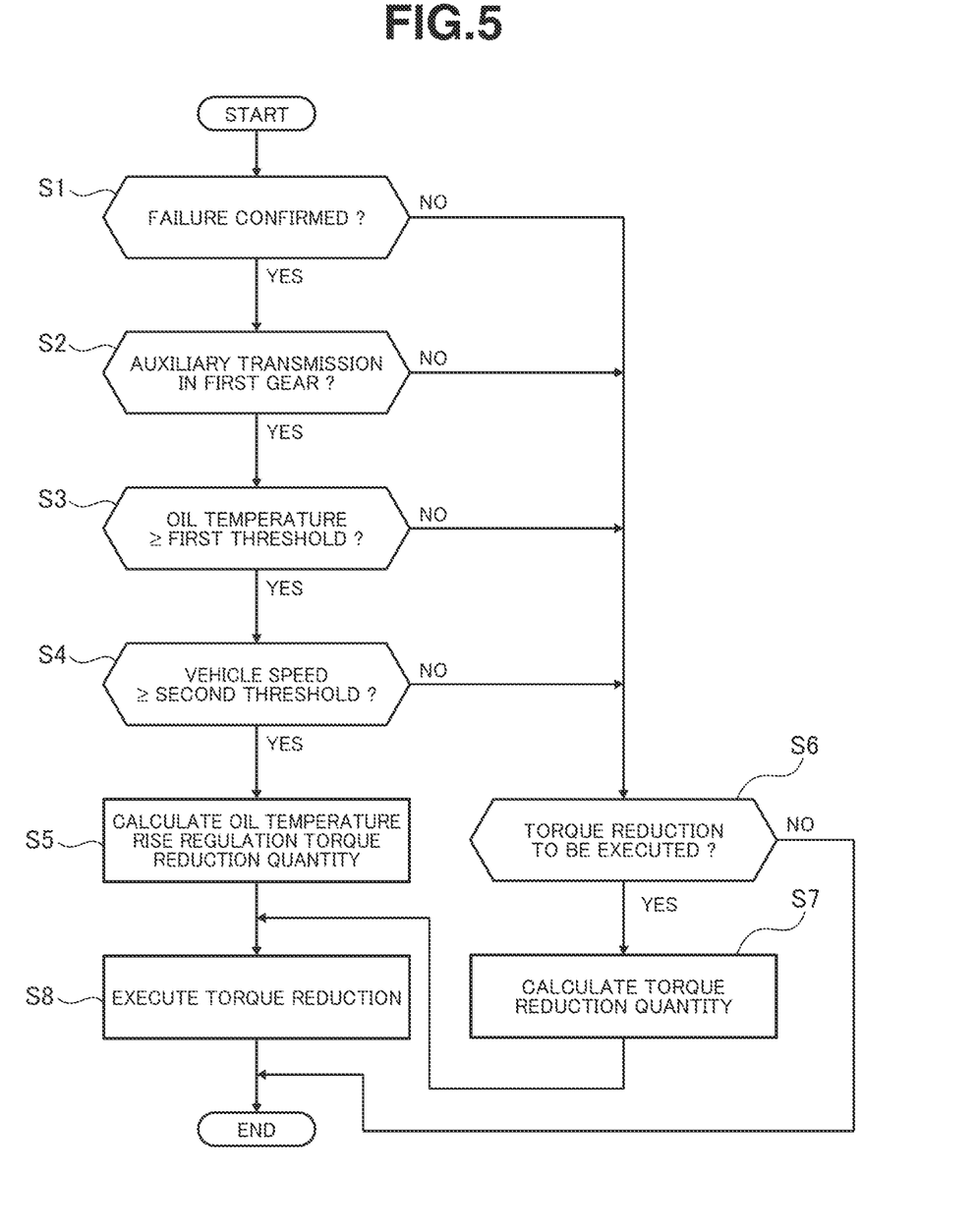
FIG. 5 is a flowchart showing a flow of an oil temperature rise regulation fail-safe control process executed by a failure diagnosis section, a fail-safe control section, and an oil temperature rise regulation torque reduction control section which are contained in a transmission control module according to the first embodiment.

FIG. 5 shows a flow of an oil temperature rise regulation fail-safe control process to be executed by the failure diagnosis section 8a, fail-safe control section 8b, and oil temperature rise regulation torque reduction control section 8c which are contained in the transmission control module 8 according to the first embodiment. The following describes steps in FIG. 5.

Subsequent to a start step, at Step S1, it determines whether or not the failure of the shift control system of the variator 20 is diagnosed as confirmed by the failure diagnosis section 8a in response to a condition that the state where the failure determination threshold value is exceeded for the predetermined duration. In case of YES (failure confirmation), the process proceeds to Step S2. In case of NO (no failure confirmation), the process proceeds to Step S6.

At Step S2, following the determination at Step S1 that the failure has been confirmed, it determines whether or not the auxiliary transmission mechanism 30 is fixed in the first gear position. In case of YES (the auxiliary transmission in the first gear position), the process proceeds to Step S3. In case of NO (the auxiliary transmission in the second gear position), the process proceeds to Step S6.

At Step S3, following the determination at Step S2 that the auxiliary transmission is in the first gear position, it determines whether or not the oil temperature Temp is higher than or equal to the first threshold value Temp1. In case of YES (oil temperature Temp≥first threshold value Temp1), the process proceeds to Step S4. In case of NO (oil temperature Temp<first threshold value Temp1), the process proceeds to Step S6.

At Step S4, following the determination at Step S3 that the oil temperature Temp≥the first threshold value Temp1, it determines whether or not the vehicle speed VSP is higher than or equal to the second threshold value VSP2. In case of YES (vehicle speed VSP≥second threshold value VSP2), the process proceeds to Step S5. In case of NO (vehicle speed VSP<second threshold value VSP2), the process proceeds to Step S6.

At Step S5, following the determination at Step S4 that vehicle speed VSP≥second threshold value VSP2, it calculates the oil temperature rise regulation torque reduction quantity based on the high oil temperature control condition torque reduction (for abnormal condition), and then proceeds to Step S8.

At Step S6, following the determination of NO at S1 or S2 or S3 or S4, it determines whether or not torque reduction operation is to be performed based on the torque reduction operation table shown in FIG. 4, the oil temperature Temp, and the vehicle speed VSP. In case of YES (torque reduction operation is to be performed), the process proceeds to Step S7. In case of NO (torque reduction operation is not to be performed), the process proceeds to an end step.

At Step S7, following the determination at Step S6 that the torque reduction operation is to be performed, it calculates the torque reduction quantity according to the torque reduction operation mode, and then proceeds to Step S8.

At Step S8, following the calculation of the oil temperature rise regulation torque reduction quantity at Step S5 or following the calculation of the torque reduction quantity at Step S7, it activates torque reduction by outputting a torque reduction request for obtaining the calculated torque reduction quantity, and then proceeds to the end step. When a plurality of torque reduction quantities are calculated, it selects the minimum one of the torque reduction quantities as the finalized torque reduction quantity by minimum selection.

The following describes behavior of the first embodiment in sections "Behavior of Oil Temperature Rise Regulation Fail-Safe Control" and "Behavior of Oil Temperature Rise Regulation in Limp-Home Mode".

[Behavior of Oil Temperature Rise Regulation Fail-Safe Control]

First, a comparative example is set where high oil temperature control condition torque reduction is activated, when the oil temperature condition that the second threshold Temp2≤the oil temperature Temp is satisfied, and the vehicle speed condition that the first threshold value VSP1≤the vehicle speed VSP is satisfied, regardless of whether it is under abnormal condition or normal condition.

In this comparative example, when the auxiliary transmission is fixed in the second gear position by the fail-safe control, the temperature of the transmission operating oil can be suppressed by activating the torque reduction even after the temperature of the transmission operating oil reaches the second threshold value Temp2.

Specifically, the temperature of the transmission operating oil rises in proportion to increase in the transmission input rotation speed and increase in the transmission input torque. Therefore, when the auxiliary transmission is fixed in the second gear position, no torque reduction operation is activated, because the transmission input speed is lower and the friction is smaller than when the auxiliary transmission is fixed in the first gear position so that the oil temperature is resistant to get high when the auxiliary transmission is fixed in the second gear position.

On the other hand, there is a demand to fix an auxiliary transmission in the first gear position in order to ensure a driving force required for traveling in limp-home mode that the vehicle travels toward a dealer or home by fixing the gear position of the auxiliary transmission mechanism by fail-safe control. In particular, in case that an automatic transmission is a transmission unit composed of a variator and an auxiliary transmission mechanism, when a failure occurs in a control system of the variator during traveling, and the transmission ratio of the variator at the time of failure is on the high transmission ratio side, the transmission ratio is fixed on the high transmission ratio side without change. In this situation, when the auxiliary transmission mechanism is fixed into the second gear position, the overall transmission ratio of the transmission unit remains high, and there is a possibility that a driving force cannot be ensured for traveling such as traveling on uphill roads.

However, a new problem was found out that when the auxiliary transmission mechanism is fixed in the first gear position, the transmission input rotational speed gets higher and the friction gets larger so that the temperature of the transmission operating oil tends to be higher, than when the auxiliary transmission is fixed in the second gear position.

Accordingly, in view of the foregoing found problem, it is an object to be achieved by the present invention to suppress the temperature of the transmission operating oil from rising in limp-home mode while ensuring a required driving force. In order to solve this problem, the oil temperature rise regulation torque reduction control section 8c is adopted and configured to output a torque reduction request in response to satisfaction of the oil temperature condition, wherein the oil temperature condition is set lower in oil temperature when the auxiliary transmission mechanism 30 is fixed in the first gear position by the fail-safe control section 8b than when the auxiliary transmission mechanism 30 is not fixed in the first gear position.

The oil temperature threshold value when the transmission is not fixed in the first gear position is the second threshold Temp2, whereas the oil temperature threshold when the transmission is fixed in the first gear position is the first threshold Temp1, with a relationship in magnitude of Temp1<Temp2.

Specifically, when a failure occurs in the control system of the variator 20 and the failure of the control system of the variator 20 is confirmed, the process proceeds as S1→S2 in the flowchart of FIG. 5, and at S2, the auxiliary transmission mechanism 30 is fixed into the first gear position. When the auxiliary transmission mechanism 30 is fixed in the first gear position and the oil temperature condition (oil temperature Temp first threshold value Temp1) and the vehicle speed condition (vehicle speed VSP≥second threshold value VSP2) are satisfied, the process proceeds from S2 as S3→S4→S5→S8. At S5, the oil temperature rise regulation torque reduction quantity is calculated based on the high oil temperature control condition torque reduction (for abnormal condition). Subsequently, at S8, the torque reduction request for obtaining the calculated oil temperature rise regulation torque reduction quantity is outputted to the engine control module 9 to activate the high oil temperature control condition torque reduction (for abnormal condition).

In this way, when the failure of the control system of the variator 20 is confirmed, the fail-safe control is allowed which fixes the auxiliary transmission mechanism 30 whose control system is normal into the first gear position. This serves to ensure a required driving force when the vehicle travels to a dealer or home in the limp-home mode. When the auxiliary transmission mechanism 30 is fixed in the first gear position, the oil temperature condition is set lower in oil temperature so that the torque reduction operation is more likely to start, than when the auxiliary transmission mechanism 30 is not fixed in the first gear position. Therefore, the transmission input torque is suppressed to a low level and the transmission input speed is thereby suppressed to a low level by the torque reduction operation of the engine 1 that is started earlier than when the auxiliary transmission is fixed in the second gear position, thereby regulating the rise in temperature of the transmission operating oil. This serves to suppress the temperature of the transmission operating oil from rising in limp-home mode while ensuring a required driving force.

However, while the vehicle speed condition (vehicle speed VSP≥second threshold VSP2) is unsatisfied, even when the auxiliary transmission mechanism 30 is fixed in the first gear position and the oil temperature condition (oil temperature Temp≥first threshold value Temp1) is satisfied, the process proceeds from S2 as S3→S4→S6→S7→S8 in the flowchart of FIG. 5. At S7, the quantity of limp-home condition torque reduction is calculated. Subsequently, at S8, a torque reduction request for obtaining the calculated quantity of limp-home condition torque reduction is outputted to the engine control module 9 to activate the limp-home condition torque reduction. There is a relationship in magnitude where the quantity of limp-home condition torque reduction<the quantity of oil temperature rise regulation torque reduction.

As described above, when the vehicle restarts after the fail-safe control is activated, the oil temperature rise regulation torque reduction is not activated until the vehicle speed condition (vehicle speed VSP≥second threshold value VSP2) is satisfied. In this way, until the vehicle speed condition (vehicle speed VSP≥second threshold value VSP2) is satisfied, the ensuring of the driving force of the engine 1 is prioritized over the suppression of rise of the temperature of the transmission operating oil. This serves to prevent the driving force from getting insufficient in the restarting scene after the fail-safe control is activated.

[Behavior of Oil Temperature Rise Regulation in Limp-Home Mode]

Figure 6:
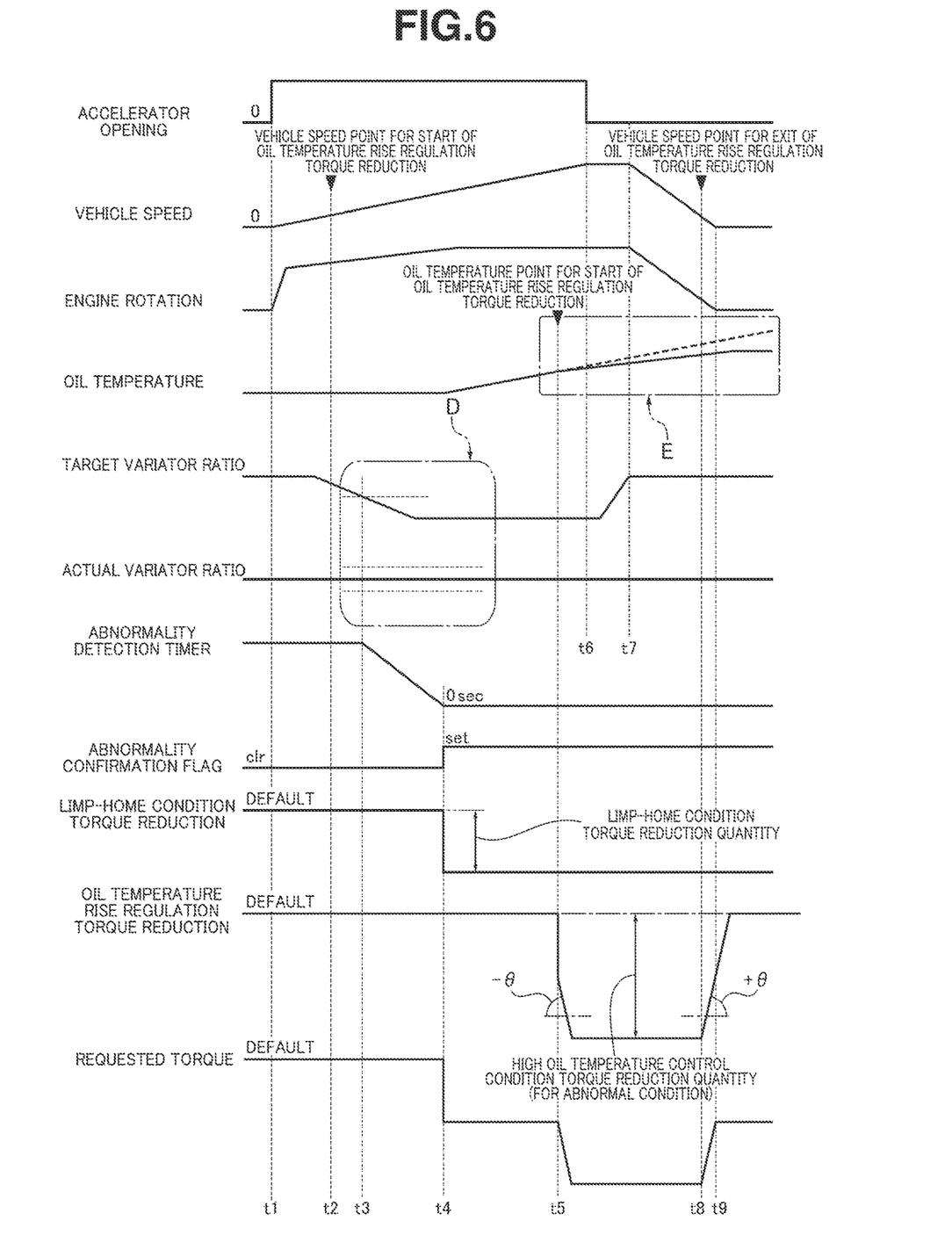
FIG. 6 is a time chart showing characteristics of parameters under a limp-home condition where the auxiliary transmission mechanism is fixed into a first gear position and the oil temperature rise regulation torque reduction control is executed in response to occurrence of a failure in a shift control system of the variator while the vehicle is traveling.

FIG. 6 shows characteristics of parameters under a limp-home condition where the auxiliary transmission mechanism 30 is fixed in the first gear position and the oil temperature rise regulation torque reduction control is executed in response to occurrence of a failure in the shift control system of the variator 20 while the vehicle is traveling. The following describes behavior of the oil temperature rise regulation in the limp-home mode with reference to FIG. 6.

At a time instant t1, the vehicle is started by depression of the accelerator, and at a time instant t2, the vehicle speed VSP reaches a vehicle speed point for start of the oil temperature rise regulation torque reduction (=first threshold value VSP1). Thereafter, at a time instant t3, an abnormality detection timer is started to operate in response to a diagnosis that a failure has occurred in the shift control system of the variator 20. At a time instant t4 when the state where the abnormality is detected has continued in time and the timer reaches the set duration, the failure is confirmed.

In FIG. 6, an arrow D indicates a region of characteristics of the target variator ratio and characteristics of the actual variator ratio, showing an example of failure detection in the shift control system of the variator 20. Specifically, the target variator ratio starts to change to a small ratio (high-side transmission ratio) just before the time instant t2, but the actual variator ratio remains unchanged from the time instant t1. Accordingly, at the time instant t3, the width of deviation between the target variator ratio and the actual variator ratio exceeds the failure determination threshold value, so that it is diagnosed that a failure has occurred in the shift control system of the variator 20. Thereafter, time elapses from the time instant t3 to the time instant t4 while the width of deviation between the target variator ratio and the actual variator ratio is above the failure determination threshold value, so that the failure of the shift control system of the variator 20 is confirmed at the time instant t4. Accordingly, the auxiliary transmission mechanism 30 is fixed in the first gear position from the time instant t4.

From the time instant t4 to a time instant t5, the oil temperature Temp is less than the first threshold value Temp1, and the oil temperature condition is unsatisfied, so that the limp-home torque reduction based on the limp-home torque reduction quantity is activated. At the time instant t5, the oil temperature condition that the oil temperature Temp is higher than or equal to the first threshold value Temp1 (=oil temperature point for start of oil temperature rise regulation torque reduction) is satisfied, so that the process shifts from the limp-home condition torque reduction operation to the high oil temperature control condition torque reduction operation (for abnormal condition).

At the time instant t5, a torque reduction request (=requested torque) having a ramp (−θ) is outputted to the engine control module 9. At a time instant t6, the vehicle starts coasting in response to foot release from the accelerator, so that the increase in vehicle speed VSP is suppressed. At a time instant t7, the vehicle speed VSP and engine speed Ne start to decrease.

At a time instant t8, the vehicle speed VSP falls to a vehicle speed point for exit of the oil temperature rise regulation torque reduction (=second threshold value VSP2), a requested torque with a ramp (+θ) is outputted to the engine control module 9 for returning to a default level of limp-home condition torque reduction. By this high oil temperature control condition torque reduction operation (for abnormal condition) from the time instant t5 to the time instant t8, the increase in the oil temperature is suppressed as indicated by a solid line indicated by an arrow E in FIG. 6, as compared with characteristics of the oil temperature indicated by a broken line. Thereafter, at a time instant t9, the vehicle speed VSP gets equal to zero and the vehicle gets stationary.

As described above, the high oil temperature control condition torque reduction (for abnormal condition) is implemented by setting the torque of the engine 1 to have a characteristic of change such that the torque of the engine 1 changes along a ramp (±θ) at a control entry to reduce the engine torque to the upper limit, and at a control exit to return the engine torque from the upper limit to a default torque. This serves to suppress the engine torque from rapidly changing at the control start of the high oil temperature control condition torque reduction (for abnormal condition) and at the control exit.

As described above, the control device for the auxiliary-transmission-equipped continuously variable transmission AT/CVT according to the first embodiment produces effects listed below.

<1> An automatic transmission (transmission unit 4) mounted between a vehicle driving source (engine 1) and a driving wheel 6, and having a plurality of gear positions, and a transmission controller (transmission control module 8) structured to control shifting of the automatic transmission (transmission unit 4) are provided. In the control device for the automatic transmission (auxiliary-transmission-equipped continuously variable transmission AT/CVT), wherein the transmission controller (transmission control module 8) includes: a failure diagnosis section 8*a* configured to diagnose whether or not a failure has occurred in a shift control system of the automatic transmission (transmission unit 4); a fail-safe control section 8*b* configured to fix the automatic transmission (auxiliary transmission mechanism 30) into a predetermined one of the gear positions in response to confirmation of the failure of the shift control system of the automatic transmission (transmission unit 4); and an oil temperature rise regulation torque reduction control section 8*c* configured to output a torque reduction request to suppress torque of the vehicle driving source (engine 1), based on temperature of transmission operating oil of the automatic transmission (transmission unit 4). The oil temperature rise regulation torque reduction control section 8*c* is configured to output the torque reduction request in response to satisfaction of an oil temperature condition, wherein the oil temperature condition is set lower in oil temperature when the automatic transmission (auxiliary transmission mechanism 30) is fixed in a first gear position by the fail-safe control section 8*b* than when the automatic transmission (auxiliary transmission mechanism 30) is not fixed in the first gear position. This feature serves to suppress the temperature of the transmission operating oil from rising in limp-home mode while ensuring a required driving force. Specifically, this allows the fail-safe control for fixation into the first gear position in response to a driving force request during limp-home operation. The torque reduction control for regulating the oil temperature rising is configured such that the oil temperature condition is set lower in oil temperature when the transmission is fixed in the first gear position so that torque reduction operation can be more early started, than when the transmission is not fixed in the first gear position.

<2> The oil temperature rise regulation torque reduction control section 8*c* is configured to: output the torque reduction request in response to satisfaction of the oil temperature condition and a vehicle speed condition that vehicle speed VSP is greater than or equal to a threshold value (second threshold value VSP2); and inhibit the torque reduction request from being outputted, while the vehicle speed VSP is less than the threshold value (second threshold value VSP2) even when the oil temperature condition is satisfied. This serves to prevent the driving force from being insufficient during vehicle restarting after the fail-safe control is executed. Specifically, the vehicle requires a larger driving force during restarting than during traveling. In consideration of this fact, by way of exception, during a short time period until exiting from a vehicle starting region, ensuring of the driving force of the vehicle driving source (engine 1) is prioritized over suppression of rise of the temperature of the transmission operating oil.

<3> The oil temperature rise regulation torque reduction control section 8*c* is configured to implement the outputting of the torque reduction request by imposing an upper limit on the torque of the vehicle driving source (engine 1) while allowing limp-home driving at a predetermined vehicle speed VSP. This feature serves to ensure travelling at the predetermined vehicle speed VSP under the limp-home condition where the oil temperature rise regulation torque reduction control is activated. Specifically, in the oil temperature rise regulation torque reduction control, increase of the quantity of torque reduction with an emphasis on suppression of rise of the oil temperature may make it impossible to ensure limp-home traveling. On the other hand, decrease of the quantity of torque reduction with an emphasis on ensuring of limp-home traveling may make it impossible to suppress the temperature of the transmission operating oil from rising. In view of the foregoing, the quantity of torque reduction of the vehicle driving source (engine 1) is set such that the suppression of rise of the temperature of the transmission operating oil and the ensuring of limp-home traveling are compatible with each other.

<4> The oil temperature rise regulation torque reduction control section 8c is configured to set the torque of the vehicle driving source (engine 1) to have a characteristic of change such that the torque of the vehicle driving source (engine 1) changes along a ramp (±θ) at a control entry to impose the upper limit on the torque of the vehicle driving source (engine 1), and at a control exit to return the torque of the vehicle driving source (engine 1) from the upper limit to a default torque. This serves to prevent the torque of the vehicle driving source (engine 1) from rapidly changing in situations where the oil temperature rise regulation torque reduction control is activated. Specifically, the oil temperature rise regulation torque reduction control is activated unexpectedly in response to satisfaction of the oil temperature condition and the vehicle speed condition during travelling. Therefore, if the torque is regulated by a characteristic of upper limit torque where the torque changes stepwise as for torque reduction control required to be responsive such as a cooperative control with transmission shifting, the torque of the vehicle driving source (engine 1) may rapidly change so that a passenger may feel uncomfortable.

<5> The automatic transmission is a transmission unit 4 including a variator 20 and an auxiliary transmission mechanism 30; the failure diagnosis section 8a is configured to diagnose whether or not a failure has occurred in a shift control system of the variator 20; and the fail-safe control section 8b is configured to fix the auxiliary transmission mechanism 30 into the first gear position and restrict downshifting of the variator 20, in response to confirmation of the failure of the shift control system of the variator 20. When the failure of the shift control system of the variator 20 is confirmed, the fixing the auxiliary transmission mechanism 30 into the first gear position serves to ensure a required driving force in limp-home mode. Specifically, in the case of the transmission unit 4, when the failure of the shift control system of the variator 20 is confirmed, the downshifting of the variator 20 is restricted. Accordingly, if the fail-safe control is configured for fixation in the second gear position, it may be difficult to ensure a driving force required in limp-home mode. However, by employing the normal control system of the auxiliary transmission mechanism 30 and fixing the auxiliary transmission mechanism 30 into the first gear position, it is possible to ensure a driving force required in limp-home mode.

<6> The auxiliary transmission mechanism 30 has gear positions including a first gear position and a second gear position; and the fail-safe control section 8b is configured to: fix the auxiliary transmission mechanism 30 into the first gear position in response to confirmation of the failure of the shift control system of the variator 20 during driving in the first gear position; and hold the auxiliary transmission mechanism 30 in the second gear position in response to confirmation of the failure of the shift control system of the variator 20 during driving in the second gear position, and fix the auxiliary transmission mechanism 30 into the first gear position in response to a condition that vehicle speed VSP gets lower than or equal to a predetermined vehicle speed. This feature serves to prevent occurrence of a shift shock due to a 2-to-1 downshift in the auxiliary transmission mechanism 30 when the failure of the shift control system of the variator 20 is confirmed during traveling in the second gear position. Specifically, when the failure of the shift control system of the variator 20 is confirmed during traveling in the second gear position and the 2-to-1 downshift of the auxiliary transmission mechanism 30 is performed, the cooperative control for smoothly changing the through transmission ratio is unavailable because the variator 20 is unavailable. Therefore, if the 2-to-1 downshift is performed simultaneously with confirmation of the failure of the shift control system of the variator 20 during traveling in the second gear position, a shift shock may occur. On the other hand, by performing the 2-to-1 downshift of the auxiliary transmission mechanism 30 after awaiting the condition that the vehicle speed VSP is lower than or equal to the predetermined vehicle speed, the downshift is prevented from causing a shift shock.

Although the control device for the automatic transmission according to the present invention is described above with reference to the first embodiment, specific configuration is not limited to the first embodiment, but may be applied with design modification or design addition unless going beyond the subject matter of the present invention defined by the claims.

In the first embodiment, the control device according to the present invention is applied to the engine vehicle provided with the auxiliary-transmission-equipped continuously variable transmission as described above. However, the control device according to the present invention may be applied to a vehicle provided with an automatic transmission called a step AT that has a plurality of gear positions and is disposed between a vehicle driving source and driving wheels. Furthermore, the vehicle is not limited to an engine vehicle, but the control device may be applied to a hybrid vehicle having an engine and a motor as vehicle driving sources, an electric vehicle having a motor as a vehicle driving source, and others.

The invention claimed is:

1. A control device for an automatic transmission, wherein the automatic transmission is mounted between a vehicle driving source and a driving wheel, and has a plurality of gear positions, the control device comprising:
a transmission controller structured to control shifting of the automatic transmission, wherein the transmission controller includes:
a failure diagnosis section configured to diagnose whether or not a failure has occurred in a shift control system of the automatic transmission;
a fail-safe control section configured to fix the automatic transmission into a predetermined one of the gear positions in response to confirmation of the failure of the shift control system of the automatic transmission; and
an oil temperature rise regulation torque reduction control section configured to output a torque reduction request to suppress torque of the vehicle driving source, based on temperature of transmission operating oil of the automatic transmission;
wherein the oil temperature rise regulation torque reduction control section is configured to output the torque reduction request in response to satisfaction of an oil temperature condition, wherein the oil temperature condition is set lower in oil temperature when the automatic transmission is fixed in a first gear position by the fail-safe control section than when the automatic transmission is not fixed in the first gear position.

2. The control device as claimed in claim 1, wherein the oil temperature rise regulation torque reduction control section is configured to:
output the torque reduction request in response to satisfaction of the oil temperature condition and a vehicle speed condition that vehicle speed is greater than or equal to a threshold value; and
inhibit the torque reduction request from being outputted, while the vehicle speed is less than the threshold value even when the oil temperature condition is satisfied.

3. The control device as claimed in claim 1, wherein the oil temperature rise regulation torque reduction control section is configured to implement the outputting of the torque reduction request by imposing an upper limit on the torque of the vehicle driving source while allowing limp-home driving at a predetermined vehicle speed.

4. The control device as claimed in claim 3, wherein the oil temperature rise regulation torque reduction control section is configured to set the torque of the vehicle driving source to have a characteristic of change such that the torque of the vehicle driving source changes along a ramp at a control entry to impose the upper limit on the torque of the vehicle driving source, and along a ramp at a control exit to return the torque of the vehicle driving source from the upper limit to a default torque.

5. The control device as claimed in claim 1, wherein:
the automatic transmission is a transmission unit including a variator and an auxiliary transmission mechanism;
the failure diagnosis section is configured to diagnose whether or not a failure has occurred in a shift control system of the variator; and
the fail-safe control section is configured to fix the auxiliary transmission mechanism into the predetermined gear position and restrict downshifting of the variator, in response to confirmation of the failure of the shift control system of the variator.

6. The control device as claimed in claim 5, wherein:
the auxiliary transmission mechanism has gear positions including a first gear position and a second gear position; and
the fail-safe control section is configured to:
fix the auxiliary transmission mechanism into the first gear position in response to confirmation of the failure of the shift control system of the variator during driving in the first gear position; and
hold the auxiliary transmission mechanism in the second gear position in response to confirmation of the failure of the shift control system of the variator during driving in the second gear position, and fix the auxiliary transmission mechanism into the first gear position in response to a condition that vehicle speed gets lower than or equal to a predetermined vehicle speed.

7. The control device as claimed in claim 2, wherein the oil temperature rise regulation torque reduction control section is configured to implement the outputting of the torque reduction request by imposing an upper limit on the torque of the vehicle driving source while allowing limp-home driving at a predetermined vehicle speed.

8. The control device as claimed in claim 7, wherein the oil temperature rise regulation torque reduction control section is configured to set the torque of the vehicle driving source to have a characteristic of change such that the torque of the vehicle driving source changes along a ramp at a control entry to impose the upper limit on the torque of the vehicle driving source, and along a ramp at a control exit to return the torque of the vehicle driving source from the upper limit to a default torque.

9. The control device as claimed in claim 7, wherein:
the automatic transmission is a transmission unit including a variator and an auxiliary transmission mechanism;
the failure diagnosis section is configured to diagnose whether or not a failure has occurred in a shift control system of the variator; and
the fail-safe control section is configured to fix the auxiliary transmission mechanism into the predetermined gear position and restrict downshifting of the variator, in response to confirmation of the failure of the shift control system of the variator.

10. The control device as claimed in claim 9, wherein:
the auxiliary transmission mechanism has gear positions including a first gear position and a second gear position; and
the fail-safe control section is configured to:
fix the auxiliary transmission mechanism into the first gear position in response to confirmation of the failure of the shift control system of the variator during driving in the first gear position; and
hold the auxiliary transmission mechanism in the second gear position in response to confirmation of the failure of the shift control system of the variator during driving in the second gear position, and fix the auxiliary transmission mechanism into the first gear position in response to a condition that vehicle speed gets lower than or equal to a predetermined vehicle speed.

11. The control device as claimed in claim 8, wherein:
the automatic transmission is a transmission unit including a variator and an auxiliary transmission mechanism;
the failure diagnosis section is configured to diagnose whether or not a failure has occurred in a shift control system of the variator; and
the fail-safe control section is configured to fix the auxiliary transmission mechanism into the predetermined gear position and restrict downshifting of the variator, in response to confirmation of the failure of the shift control system of the variator.

12. The control device as claimed in claim 11, wherein:
the auxiliary transmission mechanism has gear positions including a first gear position and a second gear position; and
the fail-safe control section is configured to:
fix the auxiliary transmission mechanism into the first gear position in response to confirmation of the failure of the shift control system of the variator during driving in the first gear position; and
hold the auxiliary transmission mechanism in the second gear position in response to confirmation of the failure of the shift control system of the variator during driving in the second gear position, and fix the auxiliary transmission mechanism into the first gear position in response to a condition that vehicle speed gets lower than or equal to a predetermined vehicle speed.

13. The control device as claimed in claim 2, wherein:

the automatic transmission is a transmission unit including a variator and an auxiliary transmission mechanism;

the failure diagnosis section is configured to diagnose whether or not a failure has occurred in a shift control system of the variator; and the fail-safe control section is configured to fix the auxiliary transmission mechanism into the predetermined gear position and restrict downshifting of the variator, in response to confirmation of the failure of the shift control system of the variator.

14. The control device as claimed in claim 13, wherein:

the auxiliary transmission mechanism has gear positions including a first gear position and a second gear position; and the fail-safe control section is configured to:
- fix the auxiliary transmission mechanism into the first gear position in response to confirmation of the failure of the shift control system of the variator during driving in the first gear position; and
- hold the auxiliary transmission mechanism in the second gear position in response to confirmation of the failure of the shift control system of the variator during driving in the second gear position, and fix the auxiliary transmission mechanism into the first gear position in response to a condition that vehicle speed gets lower than or equal to a predetermined vehicle speed.

15. The control device as claimed in claim 3, wherein:

the automatic transmission is a transmission unit including a variator and an auxiliary transmission mechanism;

the failure diagnosis section is configured to diagnose whether or not a failure has occurred in a shift control system of the variator; and the fail-safe control section is configured to fix the auxiliary transmission mechanism into the predetermined gear position and restrict downshifting of the variator, in response to confirmation of the failure of the shift control system of the variator.

16. The control device as claimed in claim 15, wherein:

the auxiliary transmission mechanism has gear positions including a first gear position and a second gear position; and the fail-safe control section is configured to:
- fix the auxiliary transmission mechanism into the first gear position in response to confirmation of the failure of the shift control system of the variator during driving in the first gear position; and
- hold the auxiliary transmission mechanism in the second gear position in response to confirmation of the failure of the shift control system of the variator during driving in the second gear position, and fix the auxiliary transmission mechanism into the first gear position in response to a condition that vehicle speed gets lower than or equal to a predetermined vehicle speed.

17. The control device as claimed in claim 4, wherein:

the automatic transmission is a transmission unit including a variator and an auxiliary transmission mechanism;

the failure diagnosis section is configured to diagnose whether or not a failure has occurred in a shift control system of the variator; and the fail-safe control section is configured to fix the auxiliary transmission mechanism into the predetermined gear position and restrict downshifting of the variator, in response to confirmation of the failure of the shift control system of the variator.

18. The control device as claimed in claim 17, wherein:

the auxiliary transmission mechanism has gear positions including a first gear position and a second gear position; and the fail-safe control section is configured to:
- fix the auxiliary transmission mechanism into the first gear position in response to confirmation of the failure of the shift control system of the variator during driving in the first gear position; and
- hold the auxiliary transmission mechanism in the second gear position in response to confirmation of the failure of the shift control system of the variator during driving in the second gear position, and fix the auxiliary transmission mechanism into the first gear position in response to a condition that vehicle speed gets lower than or equal to a predetermined vehicle speed.

* * * * *